Nov. 8, 1955　　　　　F. SRAGAL　　　　　2,722,947
SELECTOR FOR MULTIPLE PRESSURE OPERATING SYSTEM
Filed Dec. 27, 1949　　　　　　　　　　　2 Sheets-Sheet 1
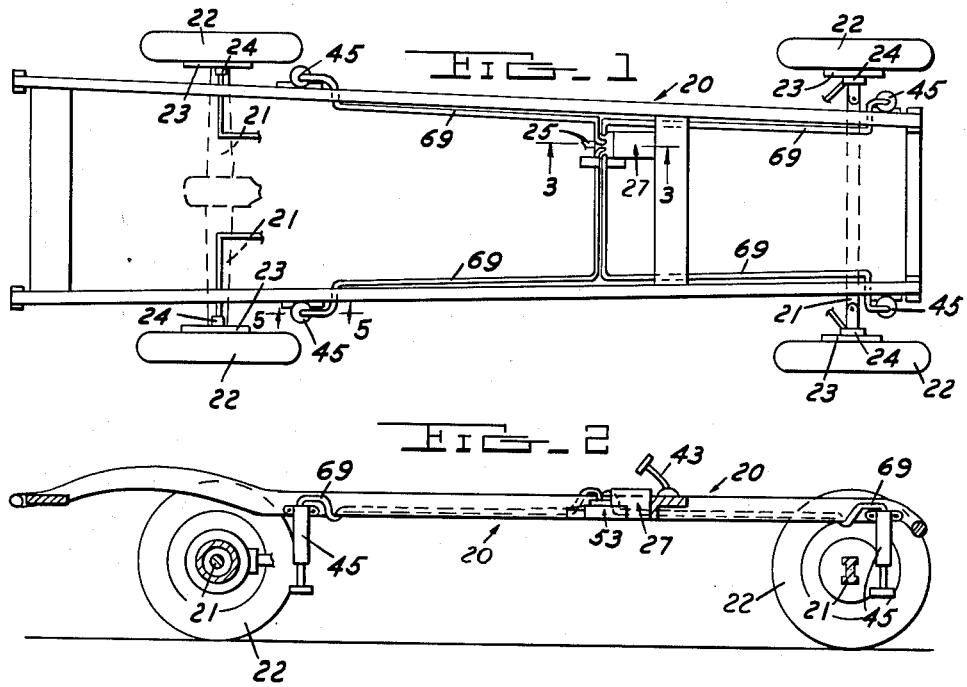
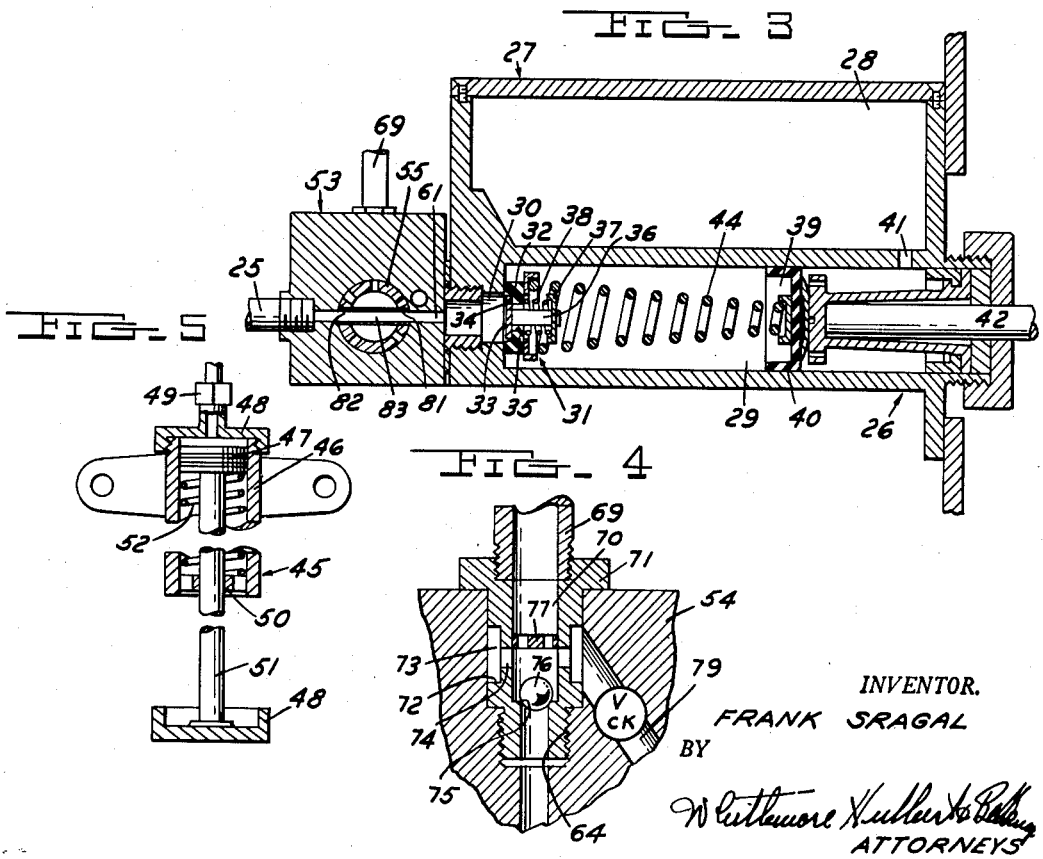
INVENTOR.
FRANK SRAGAL
BY
ATTORNEYS

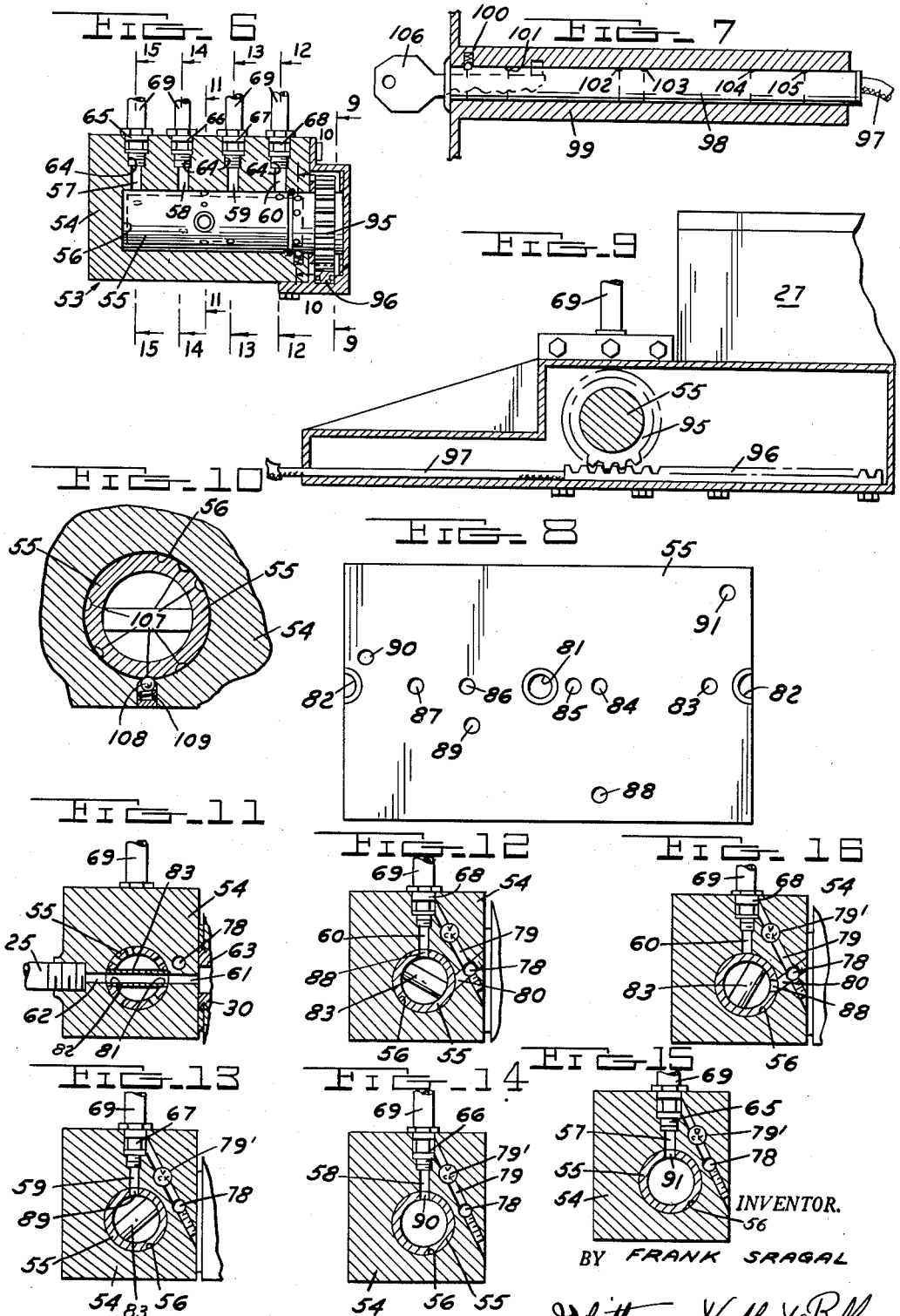

United States Patent Office 2,722,947
Patented Nov. 8, 1955

2,722,947

SELECTOR FOR MULTIPLE FLUID PRESSURE OPERATING SYSTEM

Frank Sragal, Detroit, Mich.

Application December 27, 1949, Serial No. 135,221

1 Claim. (Cl. 137—624)

This invention relates generally to control systems for fluid under pressure, and refers more particularly to an arrangement rendering it possible to direct fluid under pressure from a suitable source to a plurality of different points of demand.

One application of this invention is in connection with road vehicles having fluid pressure operated brake actuators and having fluid pressure operated lifts or jacks respectively associated with the ground engaging wheels. In accordance with this invention the pressure producing device or master cylinder normally provided for supplying fluid under pressure to the brake actuators is employed to perform the additional function of supplying fluid under pressure to the lifts or jacks.

With the above in view it is an object of this invention to provide an improved selector attachable to the delivery side of an orthodox master cylinder and having valve means movable to a plurality of different positions by means conveniently located for manipulation by the operator. In one position of the valve means, fluid from the master cylinder is compelled to flow directly to the brake actuators; while in other positions of the valve means, fluid is bypassed from the delivery port of the master cylinder to one of the jacks. Thus the brake actuators and jacks are operated independently of one another from the master cylinder.

It is another object of this invention to provide a selector wherein the valve means is indexed to successively connect the jacks to the delivery side or port of the master cylinder so that any selected jack may be operated at will by merely adjusting the selector and operating the master cylinder.

Still another object of this invention is to provide a valve member in the selector having a relief position wherein the outlet ports to the jacks are closed by the valve member and wherein these ports all communicate with a single relief port in the valve member, which in turn, communicates through the valve member with the delivery port of the master cylinder.

The foregoing as well as other objects will be made more apparent as this description proceeds, especially when considered in connection with the accompanying drawings, wherein:

Figure 1 is a diagrammatic plan view of a chassis for a road vehicle equipped with the present invention;

Figure 2 is a side elevational view of the construction shown in Figure 1;

Figure 3 is a sectional view taken on the line 3—3 of Figure 1;

Figure 4 is an enlarged sectional view through a part of the selector mechanism;

Figure 5 is a sectional view taken on the line 5—5 of Figure 1;

Figure 6 is a longitudinal sectional view through the selector mechanism;

Figure 7 is a longitudinal sectional view showing the selector operating means;

Figure 8 is a development view of the selector valve sleeve;

Figures 9 to 15 inclusive are respectively cross sectional views taken on the lines 9—9, 10—10, 11—11, 12—12, 13—13, 14—14 and 15—15; and Figure 16 is a cross sectional view showing the selector in the relief position.

Although this invention may be advantageously employed in many instances where it is desirable or essential to selectively supply fluid under pressure to a plurality of points of demand from a single source of supply, nevertheless, it finds particular utility when used in connection with road vehicles having orthodox hydraulic or fluid pressure operated brakes and having hydraulic or fluid pressure operated jacks for selectively raising any one of the ground engaging wheels.

With the above in view, reference is now made more in detail to the drawings, wherein it will be noted that the numeral 20 in Figures 1 and 2 designates a frame supported in the usual manner by axles 21 and ground engaging wheels 22. The ground engaging wheels 22 are suitably supported on the axles, and are each provided with a brake 23. The brakes 23 may be of any design capable of being operated by fluid under pressure, and each brake is equipped with an actuator 24. The actuators 24 form a part of a hydraulic or fluid pressure operated brake system, which includes a supply conduit 25 and a pressure producing device in the form of a master cylinder 26.

As shown in Figure 3 of the drawings the master cylinder 26 embodies a housing 27 having a reservoir 28 and a cylinder 29. One end of the cylinder 29 is formed with an opening 30 therethrough for the passage of fluid medium, and the flow of fluid medium from the passage into the cylinder is controlled by a check valve 31. The check valve 31 comprises a ring 32 and a valve member in the form of a disc 33. The ring 32 is seated against the inner wall of the cylinder surrounding the opening 30, and is formed with an annular seat 34. The annular seat 34 surrounds the central opening 35 through the ring 32, and is positioned at the outer side of the ring.

The valve disc has a pin 36 which projects inwardly through the opening 35 and is secured at the inner end to an abutment plate 37. A coil spring 38 surrounds the pin 36 with the outer end thereof engaging the inner side of the ring 32, and with the inner end abutting the plate 37. The purpose of the spring 38 is to yieldably maintain the valve disc 33 in engagement with the seat 34 on the ring 32 to prevent return flow of fluid from the opening 30 into the cylinder 29.

Slidably supported in the cylinder 29 for movement toward and away from the check valve 31 is a piston 39 in the form of a resilient cup having the annular flange 40 projecting toward the opening 30. The arrangement is such that movement of the piston in a direction away from the opening 30 allows fluid to flow around the piston into the cylinder at the outer side of the piston, and this fluid is introduced into the cylinder at the inner side of the piston from the reservoir through a port 41.

The piston 39 is connected to a rod 42, which in turn, is connected to a suitable manually operable control 43 supported on the chassis frame 20 in a position for convenient manipulation by the operator. It will further be noted from Figure 3 of the drawings that a coil spring 44 is interposed between the piston and the ring 32. This coil spring yieldably maintains the ring of the check valve 31 in seating relation to the adjacent wall of the cylinder, and permits return flow of the fluid medium when the piston 39 is in its retracted position.

It follows from the above that when the piston 39 is moved outwardly or in a direction toward the check valve 31, fluid medium in the cylinder 29 at the outer side of the piston flows through the check valve into the supply conduit 25, and to the brake actuators 24. On the other hand movement of the piston 39 to its retracted position enables return flow of fluid around the check valve into the cylinder 29, and also permits the flow of fluid from the inner side of the piston around the flange 40 of the resilient cup to the portion of the cylinder at the outer side of the piston.

In addition to the hydraulic brake operating mechanism previously described, the vehicle is equipped with hydraulic jacks 45 respectively secured to the frame 20 adjacent the end portions of the axles. All of the jacks are preferably identical in construction, and one typical jack construction is shown in Figure 5 of the drawings. In detail each jack comprises a cylinder 46 and a piston 47. The cylinder 46 is secured in a vertical position on the frame 20, and the upper end of the cylinder is closed by a removable cap 48 having a fitting 49 through which fluid under pressure may be introduced into the upper end of the cylinder. The lower end of the cylinder has a spider 50 secured therein, and this spider provides a bearing for a rod 51. The upper end of the rod 51 is secured to the piston 47, and the lower end of the rod is secured to a ground engaging pad 48. The piston is normally urged to its uppermost position wherein the pad 48 is elevated with respect to the ground by a coil spring 52 supported in the cylinder 46 between the piston 47 and the spider 50. For reasons which will be apparent as this description proceeds, the spring 52 is considerably stronger than the spring 44 in the master cylinder 26. This construction is preferred in order to enable the fluid to unseat the ring 32 and return to the cylinder 29 when the jack is released.

In accordance with the present invention, the brake actuator 24 and the hydraulic jacks 45 are selectively operated independently of one another by the master cylinder 26. For accomplishing this result selector mechanism 53 is interposed between the opening 30 in the master cylinder 26 and the brake supply conduit 25. The selector mechanism 53 comprises a housing 54 and a valve sleeve 55 supported for rotation within a chamber 56 formed in the housing 54. In the present instance the housing 54 is formed with four outlet ports 57, 58, 59 and 60. These ports are spaced from each other in a row extending parallel to the axis of the chamber 56 and open into the latter. In addition the housing 54 has diametrically opposed ports 61 and 62 positioned to respectively register with the opening 30 in the master cylinder 26 and the brake supplying conduit 25. It is pointed out at this time that a nipple 63 is secured to one side of the housing in alignment with the port 61, and threadably engages the opening 30 in the master cylinder.

As shown in Figure 6 of the drawings, the ports 57 to 60 inclusive respectively communicate with radially extending passages 64, and fittings 65, 66, 67 and 68 are respectively secured in the passages 64. These fittings are respectively connected to the jacks 45 by conduits 69.

All of the fittings are identical in construction and one fitting is shown in detail in Figure 4 of the drawings. This fitting is threaded at the inner end into the passage 64, and is provided with a passage 70 therethrough. The outer end of the fitting has a flange 71 which fits against the adjacent wall of the housing 54 and the outer end of the passage 70 is internally threaded for threadably engaging one of the conduits 69. An annular groove 72 is formed in the fitting intermediate the ends to cooperate with the adjacent wall of the passage 64 to provide an annular chamber 73. The chamber 73 communicates with the passage 70 through the medium of ports 74, and an annular valve seat 75 is formed in the passage 70 inwardly of the ports 74. A check valve in the form of a ball 76 is adapted to engage by gravity the seat 75 to prevent return flow of fluid through the passage 70. An apertured disc 77 is suitably secured in the passage 70 outwardly of the ports 74 and forms a stop for the check valve ball 76.

Referring now to Figures 11 to 15 inclusive, it will be noted that the housing 54 is formed with a second chamber 78. The chamber 78 extends substantially parallel to the chamber 56, and communicates with the annular chambers 73 through the medium of passages 79 also formed in the housing. Referring now more particularly to Figures 12 and 16 of the drawings, it will be noted that the chamber 78 also communicates with the interior of the chamber 56 through the medium of a relief port 80.

The valve sleeve 55 is in the form of a tube having the opposite ends closed, and having a multiplicity of ports therethrough in predetermined spaced relationship. In detail the valve sleeve has diametrically opposed ports 81 and 82 respectively registerable with the port 61, and the supply conduit 25 in the position of rotation of the valve sleeve shown in Figures 3 and 11 of the drawings. The ports 81 and 82 are connected by a tube 83 in a manner such that fluid flows directly between the intake port 61 and supply conduit 25 without entering either the valve sleeve or the chamber 56. In other words when the valve 55 is in the position of rotation shown in Figures 3 and 11, fluid may be bypassed directly from the master cylinder 26 to the brake actuators 24 without affecting the operation of the jacks 45.

The diametrically opposed ports 81 and 82 are located midway between the ends of the valve sleeve 55, and a series of ports are formed in the valve sleeve in a position to lie in a common plane with the ports 81 and 82. This series of ports are spaced from each other circumferentially of the valve 55, and are indicated in the several figures of the drawings by the numerals 83, 84, 85, 86 and 87. Since the ports 83 to 87 inclusive are located in a common plane with the ports 81 and 82, it necessarily follows that these ports will successively register with the inlet port 61 in the housing 54 upon rotation of the valve sleeve 55 relative to the housing. Thus when any one of the ports 83 to 87 inclusive are in registration with the inlet port 61, fluid from the master cylinder may flow into the sleeve valve 55.

The valve sleeve 55 is formed with a second series of ports designated by the reference numerals 88, 89, 90 and 91. These ports are predeterminedly positioned in the valve sleeve 55 to successively register with the ports 60, 59, 58 and 57 upon rotation of the valve sleeve in one direction; and are also positioned with respect to the series of ports 83 to 87 inclusive, so that one of the latter ports is always in registration with the intake opening 61 when one of the ports in the series 88 to 91 inclusive is in registration with one of the ports 57 to 60 inclusive in the housing 54.

In order to further illustrate the above, reference is again made to Figures 11 to 15 inclusive of the drawings. In Figure 12, the valve sleeve 55 is shown in a position wherein the port 88 registers with the port 60 in the housing. When in this position the port 83 in the valve sleeve registers with the intake opening 61 in the housing, and the remaining ports are closed, so that fluid from the master cylinder is compelled to flow through the valve sleeve 55 and into the port 60, which in the present instance, is connected by the conduit 69 to the right front jack. The fluid entering the top of the cylinder 46 in the right front jack forces the piston 47 downwardly against the action of the spring 52, and engages the pad 48 with the ground. Continued downward movement of the piston 47 raises the adjacent wheel of the vehicle. Return flow of the fluid from the jack to the master cylinder or selector is prevented by engagement of the ball 76 in the fitting 68 with the adjacent valve seat 75. Any fluid trapped in the chamber 78 is prevented from escaping or returning to the master cylinder by reason of the fact that the port 80 is closed by the valve sleeve.

Continued rotation of the valve sleeve to the position shown in Figure 13 of the drawings registers the port 89 in the valve sleeve with the port 59, and fluid from the master cylinder is then directed to the right rear jack. As rotation of the valve sleeve 55 is continued to the position shown in Figure 14, the port 90 registers with the port 58 in the housing to supply fluid under pressure to the left rear jack. Further rotation of the valve sleeve 55 to the position shown in Figure 15 registers the port 91 with the port 57 in the housing causing fluid under pressure from the master cylinder to flow to the left front jack. Thus all of the jacks may be selectively operated by merely rotating the valve sleeve 55 relative to the housing 54.

In order to relieve the fluid under pressure from the jacks and permit operation of the springs 52 to return the jacks to their retracted positions, the port 80 in the housing 54 is located in a common plane with the port 88 in the sleeve valve 55. The relative positions of the ports 80 and 88 are such that when these ports register, as shown in Figure 16 of the drawings, all of the ports in the valve sleeve are closed, with the exception of the port 84 which registers with the inlet port 61 in the housing. Thus fluid returning from the jack cylinders 46 flows through the chambers 73, passages 79, chamber 78, registering ports 80 and 88 to the inlet port 61. In this connection attention is called to the fact that when the valve sleeve is in its released position shown in Figure 16 of the drawings, unobstructed communication is provided between the chamber 78 and all of the jacks through the passages 79. Therefore when one jack, for example, is being released, the returning fluid may flow to the other jacks, but since the springs 52 offer considerably more resistance to the downward movement of the jack pistons 47 than the spring 44 offers to movement of the check valve ring 32 away from its seat, it follows that the fluid will return to the master cylinder without danger of operating the jacks. Of course, if it is found desirable, check valves 79' may be provided in the passages 79 to prevent reverse flow through these passages.

In the present instance the valve sleeve 55 is rotated by a gear 95 and a rack 96. The gear 95 is secured to the end of the sleeve 55 which projects beyond the housing, and the rack 96 is supported on the housing for sliding movement. One end of the rack is connected to a flexible cable 97 which has the opposite end connected to a slide 98. The slide 98 is supported in a casing 99, which in turn, is mounted on the vehicle in a position where the slide may be conveniently manipulated by the operator.

It will be noted from Figure 7 of the drawings that the slide has six positions determined by a spring biased detent 100. When the slide 98 is in its innermost position shown in Figure 7, the selector is in the position shown in Figure 11 of the drawings, wherein fluid may be bypassed directly from the master cylinder to the brake actuators. In the next or second position 101 of the slide, the valve sleeve is in the position shown in Figure 12 to supply fluid under pressure to one of the jacks. Continued outward movement of the slide to the position 102 rotates the valve sleeve 55 to the position shown in Figure 16, which is the jack releasing position. Further outward movement of the slide 98 to the positions 103, 104 and 105 respectively rotates the valve sleeve 55 to the position shown in Figures 13, 14 and 15 respectively to supply fluid under pressure to the remaining jacks in the system.

In order to prevent unauthorized operation of the slide 98, the latter may be provided with suitable locking mechanism not shown in detail and operated by a key 106. The locking mechanism provided in the slide may correspond to the ignition lock of the vehicle, so that the same key may be employed for both locks.

If desired provision may be made for definitely locating the valve sleeve 55 in any one of its adjusted positions previously described. As shown in Figure 10 of the drawings the valve sleeve 55 is formed with six recesses 107 circumferentially spaced to correspond to the six required positions of the valve sleeve. A spring influenced ball 108 is suitably supported in a bore 109 formed in the housing, and is positioned to successively engage in the recesses 107 upon rotation of the valve sleeve 55 in one direction. Thus the valve sleeve 55 is definitely located in each of its operative positions, and accidental rotation of the valve sleeve from any one of these positions is prevented.

What I claim as my invention is:

A valve comprising a housing provided with an elongated chamber and having an inlet port and a plurality of spaced outlet ports in the wall of said chamber and passages extending outwardly from the respective outlet ports, a valve sleeve supported within said chamber for rotation and having a first series of ports predeterminedly spaced to successively register with the outlet ports upon rotation of said valve sleeve in one direction, a second series of ports in said valve sleeve successively registrable with the inlet port and positioned so that one of the ports of said second series registers with said inlet port when one of the ports of said first series registers with one of said outlet ports, check valves respectively located in said passages to prevent reverse flow of fluid from said passages to said valve sleeve, a relief port in the wall of said chamber arranged in communication with said passages at points outwardly beyond the respective check valves, and an additional port in said valve sleeve registrable with said relief port in one rotative position of said valve sleeve and so located that in the latter position of said valve sleeve one of the ports in said second series registers with the inlet port, said outlet ports being closed by said valve sleeve when the latter is in said one rotative position, and check valves being provided between said relief port and the respective points of communication thereof with said passages to prevent reverse flow of fluid through said relief port to said passages.

References Cited in the file of this patent

UNITED STATES PATENTS

| Number | Name | Date |
|---|---|---|
| 974,972 | Jachimovicz | Nov. 8, 1910 |
| 1,047,499 | Clement | Dec. 17, 1912 |
| 1,534,958 | Huss | Apr. 21, 1925 |
| 1,558,789 | Carrey | Oct. 27, 1925 |
| 1,682,781 | Gardner | Sept. 4, 1928 |
| 1,780,605 | Spinney | Nov. 4, 1930 |
| 1,786,963 | Schoenberger | Dec. 30, 1930 |
| 1,806,413 | Paez, Jr. | May 19, 1931 |
| 1,958,262 | Boland | May 8, 1934 |
| 2,167,929 | Johnson | Aug. 1, 1939 |
| 2,202,422 | Hoof | May 28, 1940 |
| 2,210,449 | Fleet | Aug. 6, 1940 |
| 2,218,682 | Medson | Oct. 22, 1940 |
| 2,242,676 | Jurs | May 20, 1941 |
| 2,293,043 | Coffman | Aug. 18, 1942 |
| 2,331,790 | Nichols | Oct. 12, 1943 |
| 2,444,272 | Sragal | June 29, 1948 |
| 2,447,423 | Nies | Aug. 17, 1948 |
| 2,617,626 | Calkins | Nov. 11, 1952 |

FOREIGN PATENTS

| Number | Country | Date |
|---|---|---|
| 1,316 | Great Britain | Jan. 24, 1891 |